United States Patent [19]

Gee

[11] Patent Number: 5,524,735

[45] Date of Patent: Jun. 11, 1996

[54] BRAKE ACTUATOR ASSEMBLY INCLUDING TWIN CAM MEMBERS

[75] Inventor: Thomas A. Gee, Allen Park, Mich.

[73] Assignee: Eaton Corporation, Cleveland, Ohio

[21] Appl. No.: 331,293

[22] Filed: Oct. 28, 1994

Related U.S. Application Data

[63] Continuation of Ser. No. 24,000, Feb. 26, 1993, abandoned.

[51] Int. Cl.[6] .............................. F16D 65/09; F16D 51/00
[52] U.S. Cl. ............................................ 188/330; 188/332
[58] Field of Search .................................. 188/362, 363,
188/364, 330, 332, 338, 339, 324; 475/7,
9, 209, 228, 230, 220, 221

[56] References Cited

U.S. PATENT DOCUMENTS

| | | | |
|---|---|---|---|
| 1,802,545 | 4/1931 | Acker | 475/228 |
| 1,810,194 | 6/1931 | Weaver | 475/228 |
| 1,976,420 | 10/1934 | Taylor | 188/332 |
| 1,985,671 | 12/1934 | Taylor | 188/362 |
| 2,024,963 | 12/1935 | Boughton | 188/362 |
| 2,087,371 | 7/1937 | Chambers | 188/362 |
| 3,439,779 | 4/1969 | Saver | 188/332 |
| 3,770,879 | 11/1973 | Watson | 475/7 |
| 4,811,821 | 3/1989 | Wrench | 188/329 |
| 4,981,200 | 1/1991 | Gee | 188/330 |

*Primary Examiner*—Matthew C. Graham
*Attorney, Agent, or Firm*—L. J. Kasper; Howard D. Gordon

[57] ABSTRACT

A brake actuator assembly is disclosed for expanding internal shoe brakes in which a pair of brake shoes (17) are disposed within a brake drum (11). A pair of cam members (33,35) are fixed to a pair of cam shafts (41,43) and are operable to engage the brake shoes by use of cam followers (37,39), in response to a brake input (56,55). The cam shafts (41,43) are timed relative to each other by a pair of gears (73,75). The disclosed actuator assembly ensures that the cam members rotate through the same angular magnitude, but the amount of torque transmitted to each cam is determined by the braking force required for the respective brake shoe. The disclosed actuator assembly provides for substantially greater lift, for longer shoe wear life, without taking up as much space in the radial direction as would an equivalent S-cam arrangement.

12 Claims, 4 Drawing Sheets

BRAKE ACTUATOR ASSEMBLY INCLUDING TWIN CAM MEMBERS

This application is a continuation of application Ser. No. 08/024,000, filed Feb. 26, 1993 now abandoned.

BACKGROUND OF THE DISCLOSURE

The present invention relates to rotary cam, expanding internal shoe drum brakes, and in particular, to a rotary cam assembly including a pair of cam members able to provide greater lift for longer shoe wear life.

Typically, expanding internal shoe drum brakes of the type which are in commercial use include actuators of the S-cam type, as may be seen by reference to U.S. Pat. No. 4,905,800, assigned to the assignee of the present invention and incorporated herein by reference. Although S-cam type brakes have been generally satisfactory, S-cams are inherently limited in the amount of "rise" of the cam followers, for a given "package size". More specifically, in a conventional drum brake, the radial distance between the brake shoe return spring and the inside diameter of the drum limits the size of the S-cam, and therefore, the rise or lift which can be transmitted to the cam followers and the brake shoes.

One possible way of overcoming the rise and space limitations inherent in an S-cam brake is to provide a separate cam for each brake shoe, in which case each cam will be substantially smaller in the radial direction. It is known, although not in widespread commercial usage, to provide a separate actuator for each brake shoe. See, for example, U.S. Pat. No. 3,249,182. Such an arrangement obviously adds substantial cost by requiring an additional actuator at each brake assembly, and in addition, there is the difficulty and expense of coordinating or synchronizing the application of the two actuators, so that both brake shoes are applied at the same time to achieve the type of braking action considered desirable by the vehicle operator. In fact, such coordination may be nearly impossible in a "leading-leading" arrangement of the type shown in the above cited patent.

SUMMARY OF THE INVENTION

It is an object of the present invention to provide an improved rotary cam assembly for expanding internal shoe drum brakes which, when compared to commercially available S-cam assemblies, can provide very high shoe lift, wherein the cam arrangement does not take up nearly as much space in the radial direction as would an S-cam sized to give the equivalent cam follower travel.

It is a related object of the present invention to provide an improved rotary cam assembly which accomplishes the above-stated object by means of a cam assembly comprising two separate cam members, wherein the cam members have equal rotational displacement.

It is a further object of the present invention to provide an improved rotary cam assembly which accomplishes the above-stated objects, and which is able to provide cam rotations which are at ratios other than 1:1 with respect to the input rotation.

The above and other objects of the invention are accomplished by the provision of an improved brake actuator assembly for expanding internal shoe brakes of the type comprising first and second pivotally mounted brake shoes located interiorly of a brake drum, said brake shoes carrying first and second cam follower means, respectively. Each of the cam followers is adapted to be urged into engagement with the cam means. Rotation of the cam means from a fully disengaged condition toward an engaged condition forces the brake shoes radially outward relative to the brake drum, for frictional engagement therewith. The cam means comprises first and second cam members defining first and second working surfaces, respectively, in engagement with said first and second cam followers, respectively.

The improved brake actuator assembly is characterized by the first and second cam members defining first and second axes of rotation, respectively, substantially parallel to each other. The first and second cam members include first and second cam shafts, respectively, and an actuation means is operably associated with the first cam shaft to effect rotation thereof in a first direction. A timing means is operably associated with the first and second cam members, whereby rotation of the first cam member through a predetermined angle in the first direction results in rotation of the second cam member through substantially the same predetermined angular magnitude.

In accordance with a more limited aspect of the present invention, the improved brake actuator assembly is characterized by the first and second cam members and the first and second cam shafts being disposed adjacent each other, with each of the first and second brake shoes being pivotable about a common pivot means disposed generally diametrically opposite the cam members, about an axis of rotation of the brake drum. The first and second cam members are substantially identical to each other and are arranged in a mirror image about a central reference plane passing through the axis of rotation of the brake drum and the common pivot means.

DESCRIPTION OF THE PREFERRED EMBODIMENT

Figure 1:
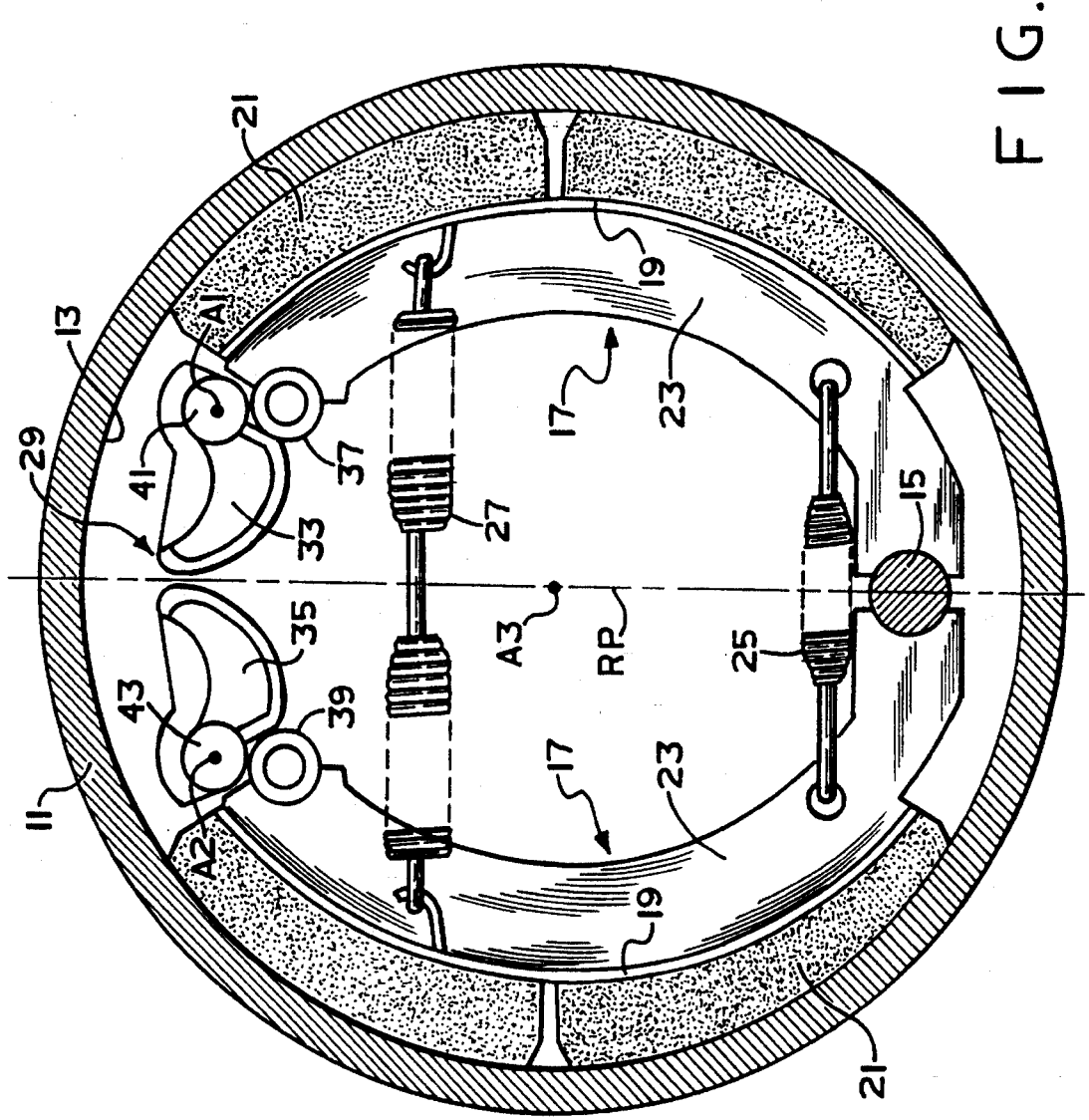
FIG. 1 is a plan view of the outboard side of an expanding internal shoe drum brake in accordance with the present invention.

Certain terminology will be used in the following description for convenience and reference only, and should be understood not to be limiting. Terms used hereinafter, such as "right" and "left" and "clockwise" and "counter-clockwise" will be understood to designate directions in the drawings to which reference is being made. Terms such as "inwardly" and "outwardly" will refer to directions toward, and away from, respectively, the axis of rotation of the particular device. The term "brakes" as used herein is intended to include various other frictional coupling devices such as clutches and the like.

Referring now to the drawings, which are not intended to limit the invention, FIG. 1 illustrates an expanding internal shoe drum brake made in accordance with the present invention. The drum brake assembly comprises a generally rotatable brake drum 11 which is shown in transverse cross-section in FIG. 1. The drum 11 defines an annular internal drum surface 13. A brake shoe pivot or anchor pin 15 is secured to a brake support spider (not shown herein), and a pair of substantially identical, opposed, generally arcuate brake shoes 17 is disposed in pivotal engagement with the anchor pin 15. Each of the brake shoes 17 includes a brake lining support or table 19, a brake lining 21 of suitable friction material, and one or more web members 23.

A brake shoe retaining spring 25 biases the adjacent, lower ends of the brake shoes 17 into engagement with the anchor pin 15, and a brake shoe return spring 27 biases the brake shoe 17 radially inwardly toward the normal, radially retracted, fully disengaged condition shown in FIG. 1.

Figure 2:
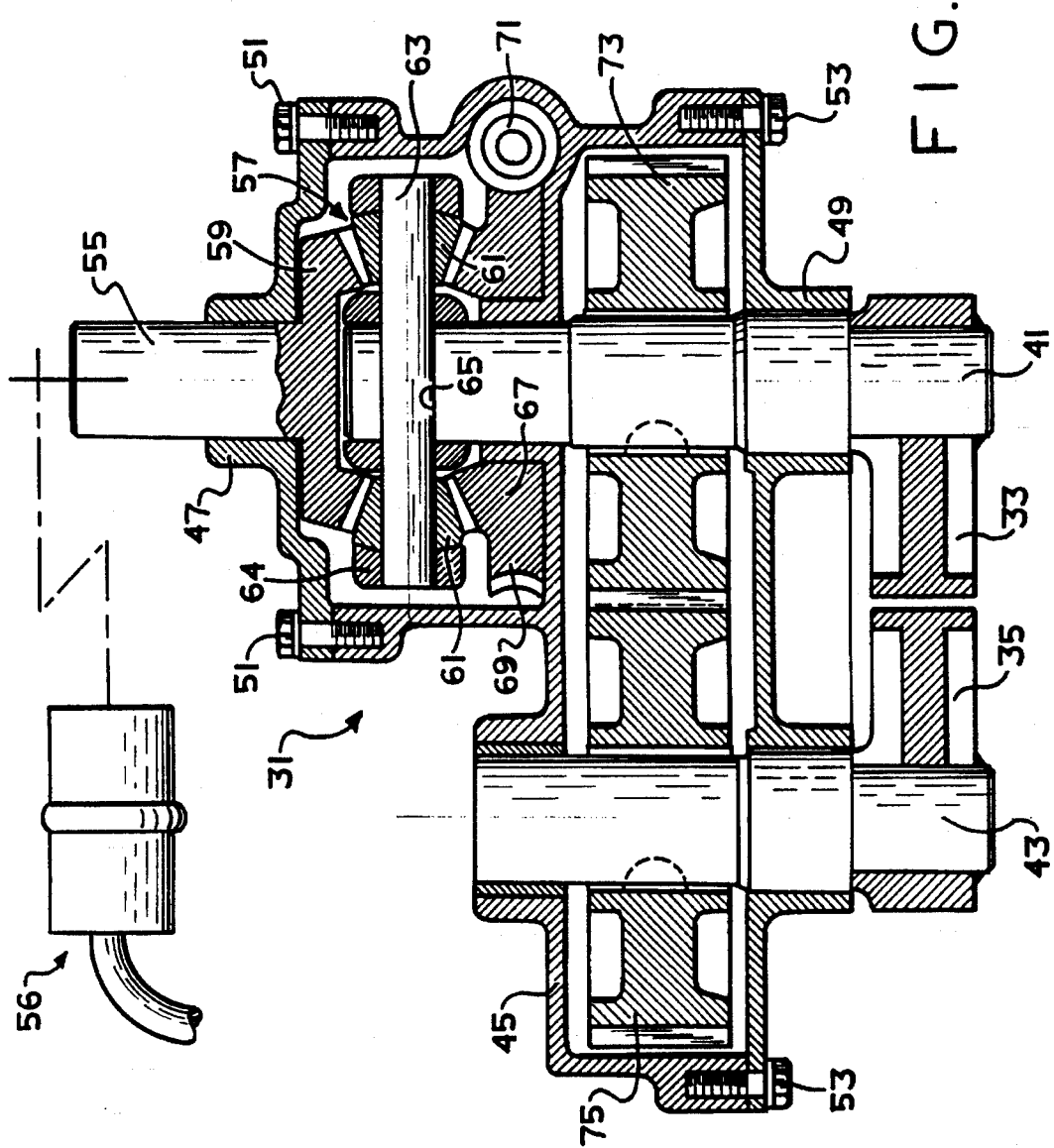
FIG. 2 is a horizontal cross-section of the input portion of the rotary cam actuator of the present invention.

The drum brake assembly includes a rotary cam actuator assembly, and includes a cam portion, generally designated 29, which is shown in the plan view of FIG. 1, and an input portion, generally designated 31, one embodiment of which is shown in the horizontal cross-section of FIG. 2.

Referring still to FIG. 1, the cam portion 29 includes a right cam member 33 and a left cam member 35. The right cam member 33 is rotatable about its axis of rotation A1, while the left cam member 35 is rotatable about its axis of rotation A2. Such rotation of the cam members causes generally radially outward pivotal movement of the brake shoes 17 about the anchor pin 15, thus causing frictional engagement of the brake linings 21 with the drum surface 13. Such engagement retards movement of the vehicle in a known manner. As the cam members 33 and 35 rotate from their positions shown in FIG. 1, they engage a pair of substantially identical right and left cam followers 37 and 39, respectively, which are rotatably supported, adjacent the upper ends of the brake shoes 17, and are commonly disposed axially between a pair of the web members 23.

As is well known to those skilled in the art, counterclockwise rotation (in FIG. 1) of the right cam member 33 would result in "cam rise", i.e., movement of the right cam follower 37 generally to the right and downward in FIG. 1, in opposition to the biasing force of the return spring 27. Similarly, clockwise rotation (in FIG. 1) of the left cam member 35 would result in "cam rise", i.e., movement of the left cam follower 39 generally to the left and downward in FIG. 1, in opposition to the biasing force of the return spring 27. It should be noted that in a conventional S-cam arrangement, one of the cam followers would be forced downward and to the side, but the other cam follower would be forced upward, and to the opposite side. Such upward force can result in that follower's brake shoe deflecting and therefore "biting" into the drum surface at the upper corner of the shoe. However, one advantage of the arrangement shown in FIG. 1 is that both cam followers are forced downward at an angle of about 15–20 degrees, such that the brake shoes 17 are loaded generally in the middle thereof.

In the subject embodiment of the invention, each of the cam members 33 and 35 includes a working surface which defines an involute profile, although those skilled in the art will understand that the invention is not so limited. It should be understood that, as used herein and in the appended claims, the term "disengaged condition" means a position of the cams in which the brake shoes 17 are either out of engagement with the drum surface 13, or in engagement with the drum surface 13, but with insufficient force being applied to accomplish braking. Conversely, the term "engaged condition" means a position of the cams in which braking is accomplished.

Referring now to FIG. 2, in conjunction with FIG. 1, the right cam member 33 is non-rotationally fixed to, or integral with, a right cam shaft 41, while the left cam member 35 is non-rotationally fixed to, or integral with, a left cam shaft 43.

The input portion 31 comprises a body member 45, an input cover 47, and an output cover 49. The input cover 47 is attached to the body member 45 by means of a plurality of bolts 51, while the output cover 49 is attached to the body member 45 by means of a plurality of bolts 53. The assembly of the body member 45 and the input and output cover members 47 and 49 together receive and rotatably support the right and left cam shafts 41 and 43.

The input cover 47 also receives and rotatably supports an input shaft 55, which may be provided with a rotary input by any suitable actuation means, of the type which is generally well known in the art, and forms no part of the present invention. In FIG. 2, rotary input is provided to the input shaft 55 by means of an air motor and linkage assembly, generally designated 56. More specifically, the air motor may act through a lever arm of a slack adjustor (not shown herein) as is illustrated and described in U.S. Pat. No. 4,208,798, assigned to the assignee of the present invention and incorporated herein by reference. By way of example only, appropriate input means are shown in U.S. Pat. Nos. 4,164,272 and 4,476,968, both of which are assigned to the assignee of the present invention, and incorporated herein by reference.

The input shaft 55 inputs rotary brake actuation motion to a differential gear set, generally designated 57. The differential set 57 includes a side gear 59, which is preferably formed integral with the input shaft 55. The side gear 59 is in toothed engagement with a pair of pinion gears 61, which are rotatably disposed on a pinion shaft 63, the ends of which are received in a pinion cage 64. The pinion shaft 63 passes through a diametral opening 65 defined by the right cam shaft 41. The pinion gears 61 are also in toothed engagement with a "stationary" side gear 67, which is referred to as being stationary because it remains stationary during actuation of the brakes. The side gear 67 also includes a portion about its outer periphery defining a worm wheel 69, which is in engagement with a worm adjustor 71. The worm adjustor 71 is rotatably received and supported at its upper and lower ends (above and below the plane of FIG. 2) by portions of the body member 45. The function of the worm adjuster 71 will be described subsequently in connection with the operation of the invention.

Disposed within the body member 45 is a sector gear 73, keyed to the right cam shaft 41. Also disposed within the body member 45, and in toothed engagement with the sector gear 73 is a sector gear 75, keyed to the left cam shaft 43. The gears 73 and 75 are referred to herein as "sector" gears, by way of example only, primarily because it is not anticipated in connection with the subject embodiment that either of the cam shafts 41 and 43 would have to be rotated more than about 180 degrees, in order to go from the disengaged condition of FIG. 1 to a fully engaged condition, even after most of the brake lining 21 has been worn away.

Operation

Referring still primarily to FIG. 2, when the vehicle operator wishes to engage the brakes, typically by depressing the brake pedal, the actuator and linkage assembly 56 rotates the input shaft 55, as was previously described. The side gear 59, which is integral with the input shaft 55, rotates the same amount, and, because the side gear 67 is stationary, the rotation of the side gear 59 causes the assembly of the pinion gears 61 and pinion shaft 63 to rotate, i.e., about the axis of the shafts 41 and 55. Such rotation of the pinion shaft 63 drives the right cam shaft 41, at the same speed of rotation. However, and by way of example only, the use of the differential gear set 57 will result in rotation of the right cam shaft 41 at some predetermined gear ratio, relative to the rotation of the input shaft 55. In the subject embodiment, that ratio is approximately 2:1, such that the cam shaft 41 will rotate at approximately one-half the speed of the input shaft 55, while transmitting approximately twice the amount of torque input to the shaft 55. Assuming counter-clockwise rotation of the input shaft 55, the right cam shaft 41 will also rotate counter-clockwise (i.e., as viewed in FIG. 1). Thus, the counter-clockwise rotation of the right cam shaft 41 is effective to rotate the right cam member 33 from its disengaged condition shown in FIG. 1 to an engaged condition.

At the same time, the counter-clockwise rotation of the right cam shaft 41 is transmitted through the sector gear 73 into clockwise rotation of the sector gear 75 and the left cam shaft 43. In the subject embodiment, the sector gears 73 and 75 are substantially identical, i.e., the teeth of the gears 73 and 75 have the same pitch diameter, circular pitch, etc., so that for any given angular movement of the right cam shaft 41, the angular movement of the left cam shaft 43 will be "substantially" identical (within normal manufacturing tolerances), but in the opposite rotational direction, i.e., the cam shafts 41 and 43 will have the same angular magnitude.

The side gear 67, which is normally stationary, as described previously, can be rotated by means of the worm adjuster 71, as a means of "adjusting" the rotational position of the cam shafts 41 and 43, relative to the rotational position of the input shaft 55. In order to accomplish such adjustment, the worm adjuster 71 is rotated, thus rotating the sidegear 67, and, assuming that the sidegear 59 is temporarily stationary (i.e., no input to the shaft 55), the result will be rotation of the pinions 61 and the pinion shaft 63 about the axis of the right cam shaft 41, thus rotating the shaft 41 slightly. For the reasons described previously, the adjustment rotation of the shaft 41 will result in the same amount of rotation of the shaft 43, but in the opposite rotational direction.

It should be understood that, hereinafter and in the appended claims, references to the cam members 33 and 35 may, unless otherwise indicated, include the cam shafts 41 and 43, respectively, on which the cam members are non-rotatably mounted. Up to this point, the description of the invention has focused on the fact that the cam members 33 and 35 have the same magnitude of rotational displacement whenever braking actuation occurs. However, it should be noted that one of the advantages of the present invention is the ability to transmit different torques, and therefore, brake actuation forces, even as the magnitude of the cam displacements are maintained equal to each other. Referring again to FIG. 1, in conjunction with FIG. 2, and by way of example only, if the vehicle were moving to the left in FIG. 1, the drum 11 would be rotating counter-clockwise. In that case, the left-hand brake shoe 17 would be the "leading" shoe, while the right-hand brake shoe 17 would be the "trailing" shoe. As is well known to those skilled in the art, a substantially greater force is required to apply the trailing brake shoe than is required to apply the leading brake shoe. By way of example only, proper braking action may require a linear force of only 10,000 pounds on the left cam follower 39, while a linear force of 30,000 pounds is required on the right cam follower 37. Utilizing the input portion 31 shown in FIG. 2 makes it possible to transmit different amounts of torque, as needed, to the cam members 33 and 35, recognizing that each cam member may, at certain times, be transmitting brake force to a leading shoe, and at other times, may be transmitting brake force to a trailing shoe.

Alternative Embodiment

Figure 3:
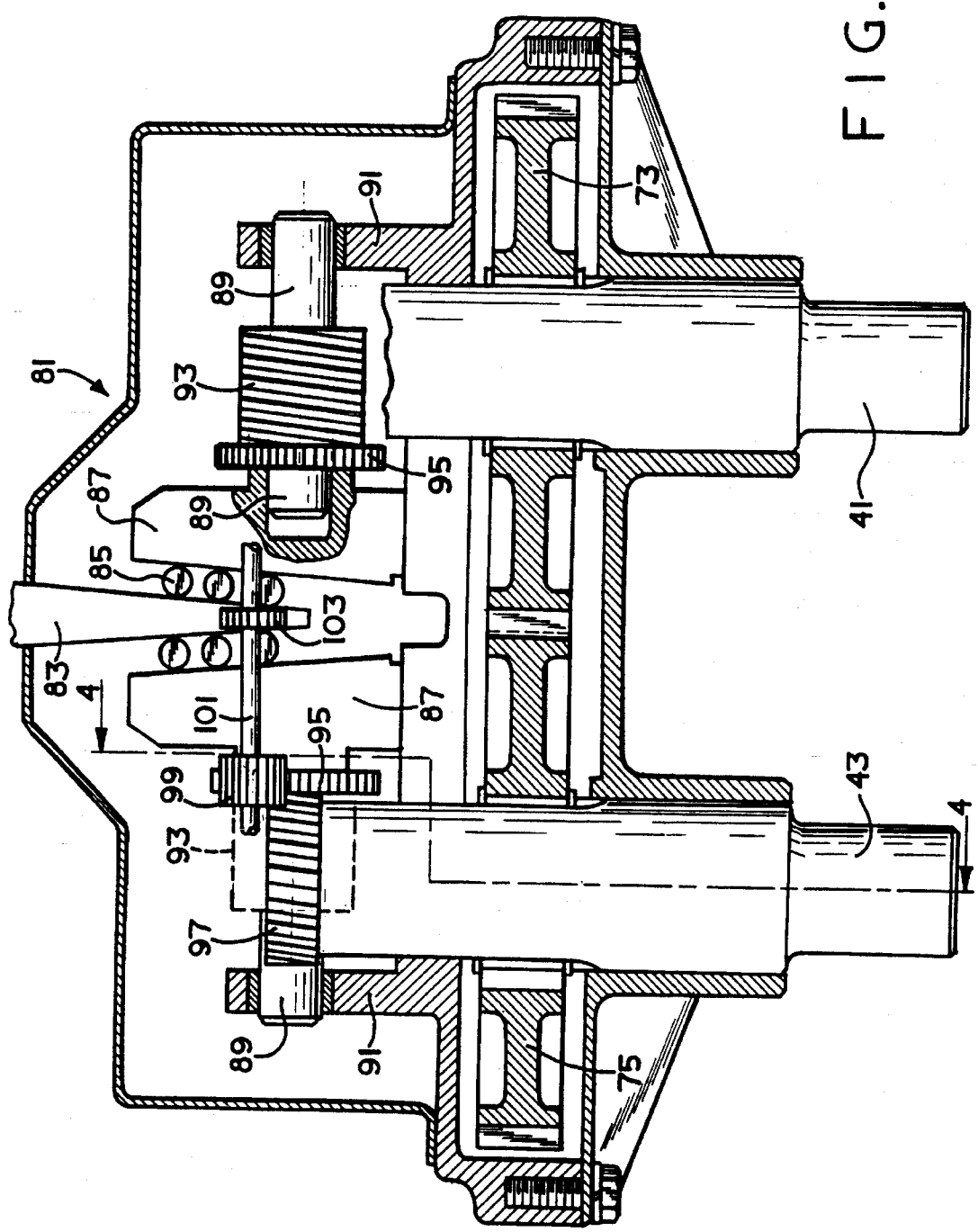
FIG. 3 is a horizontal cross-section of the input portion of an alternative embodiment of the rotary cam actuator of the present invention.
Figure 4:
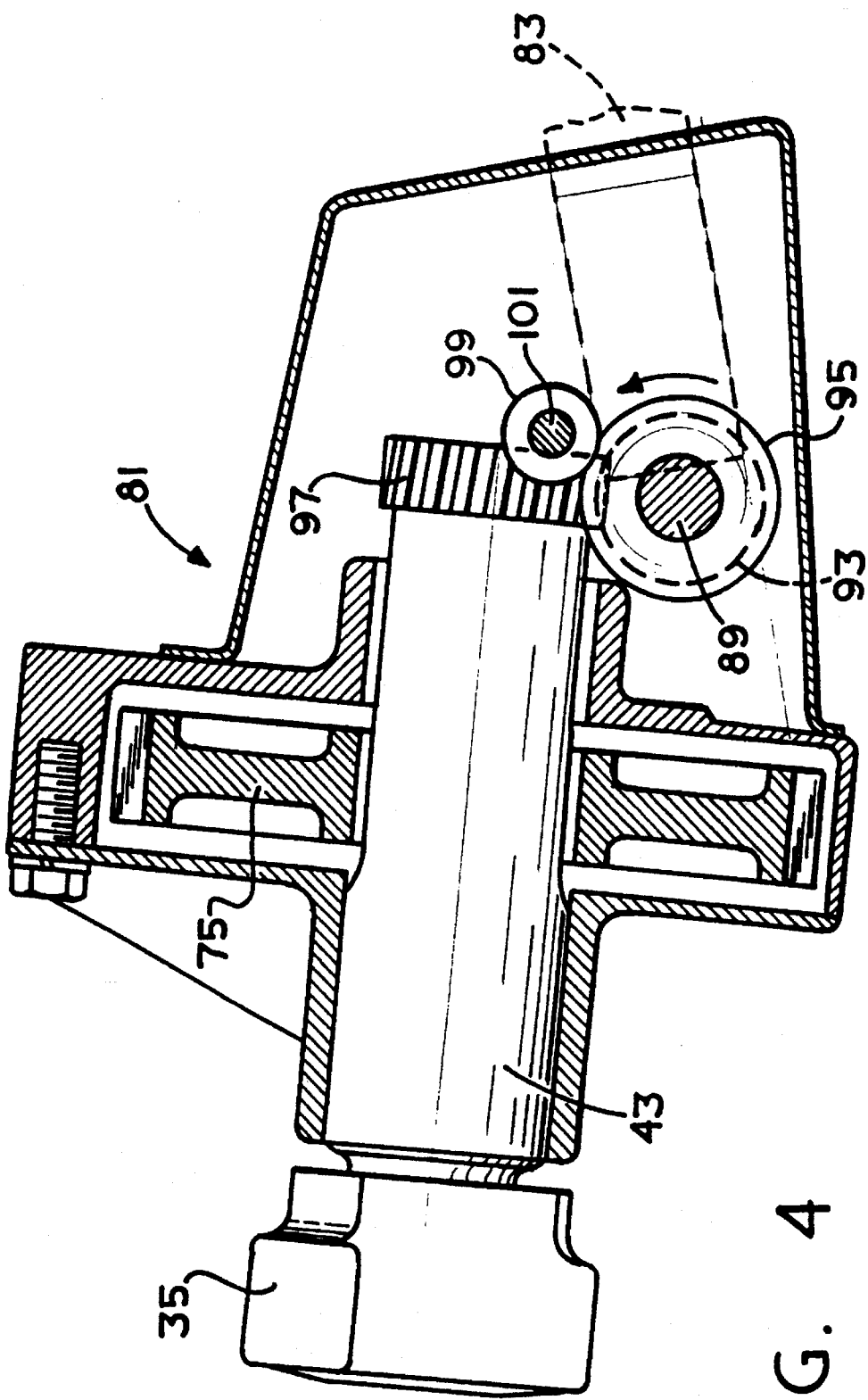
FIG. 4 is a somewhat diagrammatic view, taken generally along 4—4 of FIG. 3, and on the same scale.

Referring now primarily to FIGS. 3 and 4, there will be described an alternative embodiment of an input portion, generally designated 81. In the alternative embodiment, the same or substantially the same elements will bear the same reference numerals, with different or substantially modified elements bearing reference numerals in excess of 81. It should be understood that the purpose of the input portion 81 is generally the same as that of the input portion 31, i.e., to provide equal magnitude of rotational displacement to the two cam members, while transmitting whatever torque is required for proper brake actuation.

The input portion 81 includes a wedge member 83, and it may be seen in FIG. 3 that the mechanism is generally symmetrical with respect to the wedge member 83. However, for clarity of illustration, the two halves of the mechanism are shown somewhat differently, as will be described in greater detail subsequently.

On both sides of the wedge 83 is a plurality of rollers 85, the rollers bearing against a surface of an anvil 87 (shown only in FIG. 3). Each anvil 87 defines a cylindrical opening within which is disposed a worm shaft 89, the opposite end of which extends through a bushing received in an opening defined by a wall portion 91. Surrounding the worm shaft 89 is a worm gear 93 (shown only in dotted line on the left side of the mechanism, and in FIG. 4). Attached to each worm gear 93, and fixed for rotation therewith, is a toothed wheel 95. At the rearward (upper in FIG. 3) end of each of the cam shafts 41 and 43 there is a worm wheel 97 fixed thereto (but for ease of illustration, the worm wheel 97 attached to the cam shaft 41 is not shown). The worm wheel 97 is in toothed engagement with the worm gear 93, as may best be seen in FIG. 4.

In engagement with each of the toothed wheels 95 is an adjustor gear 99 (see FIG. 4), with only the left-hand adjustor gear 99 being shown in FIG. 3. The adjustor gears 99 are mounted on a shaft 101, which is broken away in FIG. 3, but which would preferably extend through, and be supported by, the wall portions 91, at the opposite ends of the shaft 101. In the middle of the shaft 101 is an input gear 103, which is in toothed engagement with an upper surface of the wedge member 83, although, for ease of illustration, the teeth are not shown on the wedge member 83 in FIG. 3, and in FIG. 4 the wedge member 83 is shown only in dashed line because it is "behind" the plane of FIG. 4, and is included only to show its relative position.

Preferably, there would be disposed between the shaft 101 and the gear 103 a clutch (not shown in FIGS. 3 and 4), which would transmit more torque when the brakes are being applied than when the brakes are being released, and the wedge 83 is moving up in FIG. 3. Such a clutch could be a coil clutch of the type, and having the general characteristics, shown in U.S. Pat. No. 4,351,419, assigned to the assignee of the present invention and incorporated herein by reference.

Referring now to both FIGS. 3 and 4, the operation of the alternative embodiment will be described. When brake actuation occurs, the wedge member 83 is moved downwardly in FIG. 3 (to the left in FIG. 4) between the rows of rollers 85, causing the anvils 87 to move outwardly, i.e., to the left and right in FIG. 3, away from the wedge 83. At the same time, the movement of the wedge 83 causes rotation of the input gear 103 and the adjustor gears 99 (clockwise in FIG. 4). The result is counter-clockwise rotation of the toothed wheels 95 (see arrow in FIG. 4), and also counter-clockwise rotation of the worm gears 93. The outward movement of the anvils 87 also causes "outward" movement of each of the toothed wheels 95 and its respective worm gear 93. The combination of linear and rotational motion of each of the worm gears 93, while in engagement with the respective worm wheel 97, causes the same counter-clockwise rotation of the cam shaft 41 as occurred in the primary embodiment. Because of the toothed engagement of the gears 73 and 75, the cam shaft 43 has the same rotational displacement as the shaft 41, but in the opposite direction, again as in the primary embodiment.

In the embodiment of FIGS. 3 and 4, because there is a separate torque input to each cam shaft, each gear does not have to be able to transmit the entire torque, as was the case with the gears in the primary embodiment, but in the alternative embodiment, each gear is required only to be able to transmit the difference between the torque on the cam shaft 41 and the torque on the cam shaft 43. Therefore, and by way of example only, if the cam shaft 43 were transmitting 5,000 inch pounds of torque, and the cam shaft 41 were transmitting 15,000 inch pounds of torque, each of the gears 73 and 75 in the FIG. 3 embodiment would have to be capable of transmitting the difference (i.e., 10,000 inch pounds), rather than the sum of the torques (i.e., 20,000 inch pounds) as would be the case in the primary embodiment.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A brake actuator assembly for expanding internal shoe brakes of the type comprising first and second pivotally mounted brake shoes located interiorly of a brake drum, said brake shoes carrying first and second cam follower means, respectively, each of said cam follower means adapted to be urged into engagement by cam means; rotation of said cam means from a fully disengaged condition toward an engaged condition forcing said brake shoes radially outwardly relative to said brake drum, for frictional engagement therewith; said cam means comprising first and second cam members defining first and second working surfaces, respectively, in engagement with said first and second cam follower means, respectively; characterized by:

(a) said first and second cam members defining first and second axes of rotation, respectively, said axes being substantially parallel to each other;

(b) said first and second cam members including first and second cam shafts, respectively;

(c) actuation means operably associated with said first cam shaft to effect rotation thereof in a first direction (CCW); and (d) timing means operably associated with said first and second cam members whereby rotation of said first cam member through a predetermined angle in said first direction (CCW) results in rotation of said second cam member through an angle having a predetermined relationship to said predetermined angular magnitude throughout the range of actuation of said cam members; and (e) said timing means including means operable to change rotational position of said first cam shaft relative to an input device, said means comprising differential gear means disposed intermediate said input device and said first cam shaft.

2. A brake actuator assembly as claimed in claim 1, characterized by said first and second cam members and said first and second cam shafts being disposed transversely adjacent each other, each of said first and second brake shoes being pivotable about a pivot means, disposed generally diametrically opposite said first and second cam members, about an axis of rotation of said brake drum.

3. A brake actuator assembly as claimed in claim 2, characterized by said first and second cam members being substantially a mirror image of each other about a central reference plane passing through said axis of rotation of said brake drum and said pivot means.

4. A brake actuator assembly as claimed in claim 3, characterized by said timing means being operable whereby, rotation of said first cam member in said first direction (CCW) results in rotation of said second cam member in a second direction (CW).

5. A brake actuator assembly as claimed in claim 1, characterized by said timing means comprises a first gear member operably associated with said first cam member for rotation therewith, and a second gear member, in toothed engagement with said first gear member and operably associated with said second cam member for rotation therewith.

6. A brake actuator assembly as claimed in claim 5, characterized by each of said first and second gear members comprises a gear segment, whereby rotation of said first cam member in said first direction (CW) results in rotation of said second cam member in a second (CW) direction.

7. A brake actuator assembly as claimed in claim 1, characterized by said first and second working surfaces defined by said first and second cam members, respectively, define a portion of an involute profile.

8. A brake actuator assembly for expanding internal shoe brakes of the type comprising first and second pivotally mounted brake shoes located interiorly of a brake drum, said brake shoes carrying first and second cam follower means, respectively, each of said cam follower means adapted to be urged into engagement by cam means; rotation of said cam means from a fully disengaged condition toward an engaged condition forcing said brake shoes radially outwardly relative to said brake drum, for frictional engagement therewith; said cam means comprising first and second cam members defining first and second working surfaces, respectively, in engagement with said first and second cam follower means, respectively; each of said first and second brake shoes being pivotable about a common pivot means, disposed generally diametrically opposite said first and second cam members, about an axis of rotation of said brake drum; characterized by:

(a) said first and second cam members defining first and second axes of rotation, respectively, closely spaced to and disposed equally and oppositely about a central reference plane (RP) passing through said axis of rotation of said brake drum and said common pivot means;

(b) said first and second cam members being substantially a mirror image of each other about said central reference plane (RP);

(c) actuation means operably associated with said first cam member to effect rotation thereof in a first direction (CCW);

(d) timing means operably associated with said first and second cam members whereby rotation of said first cam member through a predetermined angle in said first direction (CCW) results in rotation of said second cam member through an angle having a predetermined relationship to said predetermined angle in a second direction (CW) in response to unequal forces being exerted on said first and second cam members during engagement thereof with said brake drum; and (e) said timing means further comprising a first gear member operably associated with said first cam member for rotation therewith, and a second gear member, in toothed engagement with said first gear member, and operably associated with said second cam member for rotation therewith.

9. A brake actuator assembly as claimed in claim 8, characterized by said first and second working surfaces defined by said first and second cam members, respectively, define a portion of an involute profile.

10. A brake actuator assembly as claimed in claim 8, characterized by said timing means includes means operable to change rotational position of said first cam member relative to an input device.

11. A brake actuator assembly as claimed in claim 10, characterized by said means operable to change position comprises differential gear means disposed intermediate said input device and said first gear member.

12. A brake actuator assembly as claimed in claim 8, characterized by said actuation means comprises a wedge member linearly movable between a brake engaged position and a brake disengaged position, and further comprising gear means operable to transmit said linear movement of said wedge member into said rotation of said first and second cam members.

\* \* \* \* \*